(12) United States Patent
Amada et al.

(10) Patent No.: US 6,249,639 B1
(45) Date of Patent: Jun. 19, 2001

(54) DIGITAL INFORMATION RECORDING-REPRODUCING APPARATUS

(75) Inventors: Nobutaka Amada; Takao Arai; Takaharu Noguchi; Hiroo Okamoto; Shigeru Yamazaki, all of Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/257,187

(22) Filed: Feb. 25, 1999

Related U.S. Application Data

(62) Division of application No. 08/255,758, filed on Jun. 7, 1994, now Pat. No. 5,878,188.

(30) Foreign Application Priority Data

| Jun. 7, 1993 | (JP) | 5-135585 |
| Jun. 7, 1993 | (JP) | 5-135586 |
| Jun. 7, 1993 | (JP) | 5-135587 |

(51) Int. Cl.[7] ................................................ H04N 5/76
(52) U.S. Cl. ................................. 386/46; 386/94
(58) Field of Search .................... 386/46, 94, 95, 386/112; 360/60; 380/201; H04N 5/76

(56) References Cited

U.S. PATENT DOCUMENTS

| 4,730,222 | 3/1988 | Schauffele | 386/101 |
| 4,930,158 | * 5/1990 | Vogel | 386/94 |
| 4,942,487 | 7/1990 | Noguchi et al. | |
| 4,963,991 | 10/1990 | Honjo | 386/14 |
| 5,084,790 | * 1/1992 | Endoh | 360/60 |
| 5,133,079 | 7/1992 | Ballantyne et al. | |
| 5,235,471 | 8/1993 | Fell et al. | |
| 5,247,401 | 9/1993 | Umemoto et al. | 358/338 |
| 5,253,275 | 10/1993 | Yurt et al. | |
| 5,278,706 | 1/1994 | Iketani et al. | 358/335 |
| 5,377,050 | 12/1994 | Yun | 358/335 |
| 5,379,120 | 1/1995 | Honjo | 358/335 |
| 5,381,476 | 1/1995 | Kimoto et al. | 358/335 |
| 5,410,369 | 4/1995 | Nakajima | 358/335 |
| 5,467,197 | * 11/1995 | Hoff | 386/94 |
| 5,517,368 | * 5/1996 | Arai et al. | 386/112 |

FOREIGN PATENT DOCUMENTS

| 3613230 | 10/1986 | (DE) . |
| 3840290 | 5/1990 | (DE) . |
| 60-159564 U | 10/1985 | (JP) . |
| 5-258463 | 10/1993 | (JP) . |
| 5-304680 | 11/1993 | (JP) . |
| 92/12599 | 7/1992 | (WO) . |

OTHER PUBLICATIONS

M. Harada, "Future View of CATV", *Journal of the Institute of Television Engineers of Japan*, vol. 47, No. 4, Apr. 1993, pp. 494–499 (in Japanese).

* cited by examiner

Primary Examiner—Huy Nguyen
(74) Attorney, Agent, or Firm—Antonelli, Terry, Stout & Kraus, LLP

(57) ABSTRACT

A digital information recording-reproducing apparatus for recording and reproducing a digital information signal which includes a recording circuit for recording the digital information signal together with control information, and a reproducing circuit for detecting the recorded control information at a time the recorded digital information signal is to be reproduced, and reproducing the recorded digital information signal only if the detected control information satisfies a predetermined condition.

4 Claims, 13 Drawing Sheets

| PROGRAM NO. | TIME CODE | TYPE | RECORDING DATE & TIME | USER NO. |
|---|---|---|---|---|
|  |  |  |  |  |

FIG. 15
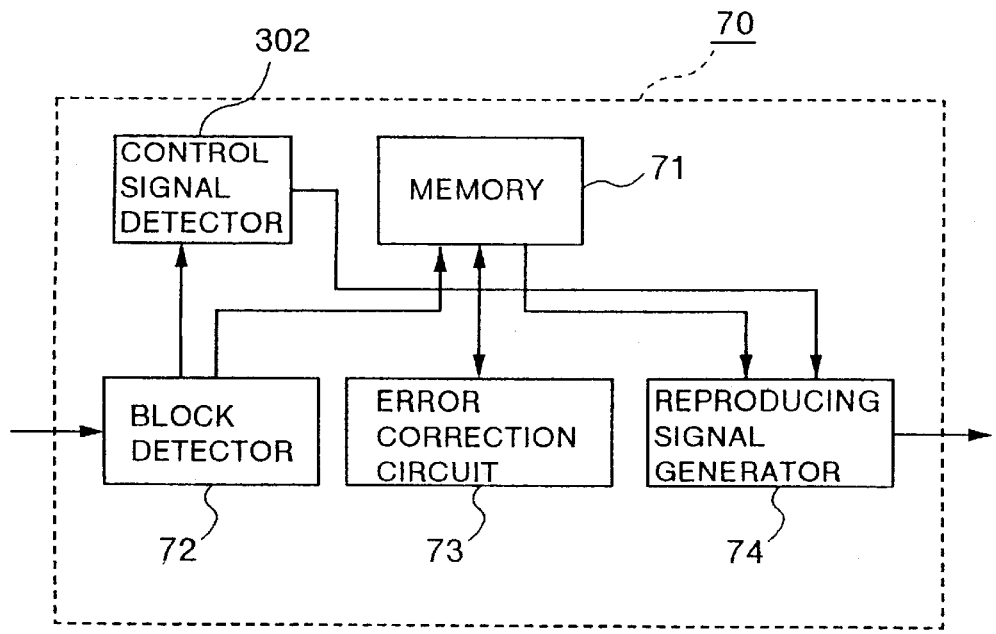
FIG. 16
| PROGRAM NO. | TIME CODE | TYPE | RECORDING DATE & TIME | USER NO. | ENCRYPT CODE |
|---|---|---|---|---|---|
FIG. 18
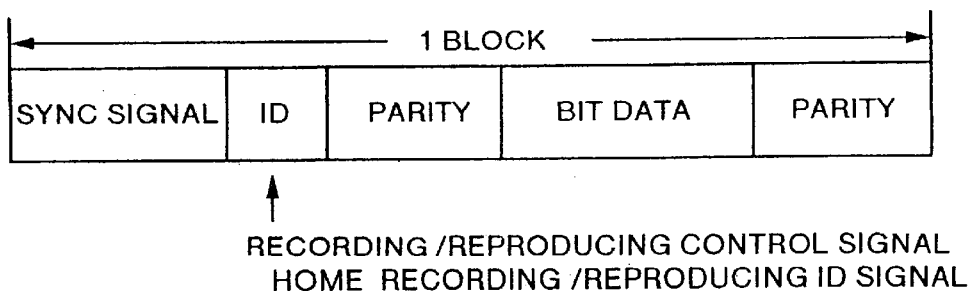

DIGITAL INFORMATION RECORDING-REPRODUCING APPARATUS

CROSS-REFERENCE TO RELATED APPLICATION

This application is a division of application Ser. No. 08/255,758 filed on Jun. 7, 1994, now U.S. Pat. No. 5,878,188.

BACKGROUND OF THE INVENTION

FIELD OF THE INVENTION

The present invention relates to a digital information recording-reproducing apparatus, or more in particular to a digital information recording-reproducing apparatus having a time-base restoration function.

DESCRIPTION OF THE RELATED ART

The Journal of the Institute of Television Engineers of Japan; Vol. 47, No. 4, Apr. 1993, pp. 494–499, describes a system conceived to transmit audio or video software through radio wave or a cable to be recorded in each home.

In this conventional system, however, the rate at which software information is transmitted, recorded and reproduced is fixed. Especially, no measure is taken to shorten the recording time.

Also, the problem of the above-mentioned conventional system is that the sale or rent which may be made of audio or video software requires management of information on customers, number of days rented, etc.

One such system may be interactive, in which the user requests the video software he wants from the transmitting end, and the software supplier transmits the desired software. In such a case, however, it takes a predetermined length of time before the wanted digital information signal is actually transmitted from the time the particular video software is requested. More specifically, the transmitting end is required to prepare the video data to be transmitted or to stand by until a transmission channel becomes available. This leads to the problem that the user cannot determine the time to start his VTR.

SUMMARY OF THE INVENTION

A first object of the invention is to obviate the above-mentioned problems and to provide a digital information recording-reproducing apparatus having the functions of shortening the recording time and restoring the signal on time base.

A second object of the invention is to obviate the above-mentioned problems and to provide a digital information recording-reproducing apparatus capable of easily managing information on customers, number of days rented, etc.

A third object of the invention is to obviate the above-mentioned problems and to provide a digital information recording-reproducing apparatus simple to operate, in which recording errors can be minimized.

In order to achieve the first object, according to the invention, there is provided a digital information recording-reproducing apparatus in which software information is transmitted by being reduced to 1/n temporally, the received software reduced to 1/n temporally is recorded in magnetic tape at a predetermined rate, and the recorded signal is reproduced at the rate 1/n the recording rate.

In order to achieve the second object, according to the invention, there is provided a digital information recording-reproducing apparatus in which control codes such as the user number and the recording date are additionally recorded in the recording signal so that the information on customers, number of days rented, etc. are managed based on the added information at the time of reproduction.

According to a first method for achieving the third object of the invention, there is provided a digital information recording-reproducing apparatus comprising a control signal generator at the transmitting end for controlling the operating conditions of recording-reproducing means (VTR), wherein an output signal of the control signal generator is transmitted together with a digital information signal through transmission means before recording, and a control signal detector at the receiving end is connected with the receiver and produces an output signal thereby to control the VTR in recording mode.

According to a second method for achieving the third object of the invention, there is provided a digital information recording-reproducing apparatus comprising a control signal generator at the transmitting end for controlling the operating conditions of the VTR, second transmission means for transmitting an output signal of the control signal generator, and a control signal detector at the receiving end, wherein an output signal of the control signal generator is transmitted through the second transmission means before starting the recording, the VTR is controlled in recording mode by the output signal of the control signal detector, and the digital information signal transmitted through the first transmission means is recorded by the VTR.

According to a third method for achieving the third object of the invention, there is provided a digital information recording-reproducing apparatus wherein the magnetic tape is divided into a number $\underline{a}$ of recording areas ($\underline{a}$: integer of 1 or more) each assigned to one video software.

The recording time can be shortened to 1/n by recording the software information temporally compressed to 1/n.

At the time of reproduction, the signal is reproduced at the rate 1/n the recording rate, and therefore the time axis is expanded by n times to reproduce the original software information before temporal compression.

At the time of reproduction, the control information including the user number and recording date are read. In the case where the user number is different, however, no reproducing operation is performed. In the case of software rental, on the other hand, no reproducing operation is performed after the lapse of a predetermined time from the recording. By so doing, information on customers, the number of days rented, etc. can be managed appropriately.

According to the first method, the control signal for controlling the VTR in recording mode is transmitted through the same transmission channel of radio wave or cable before the digital information signal of the video software to be transmitted. A demodulator at the receiving end, once it has received the control signal, immediately sets the VTR in recording mode.

According to the second method, the control signal for controlling the VTR in recording mode is transmitted through a second transmission channel such as the telephone line different from the transmission channel for transmitting the digital information signal before the digital information signal of the video software to be transmitted. A second demodulator at the receiving end, once it has received this control signal, immediately or after the lapse of a predetermined time, sets the VTR in recording mode.

According to the third method, the magnetic tape is divided beforehand (preformatted) into a plurality of recording areas, each of which is assigned to a video software for sequentially recording the video data from the tape starting section. In the process, the recording information on the video data that has been recorded in each area is recorded in the header or tail section of the particular area, and according to the contents of the recording information, the next area to be recorded is automatically selected.

BRIEF DESCRIPTION OF THE DRAWINGS

FIG. 15 is a block diagram showing an example configuration of a reproducing decoder according to the invention.

FIG. 16 is a diagram showing an example configuration of the control signal according to the embodiment shown in FIG. 9.

FIG. 18 is a diagram showing an example configuration of the output signal of a transmitting encoder according to the invention.

DESCRIPTION OF THE PREFERRED EMBODIMENTS

Embodiments of the present invention will be described below with reference to the accompanying drawings.

Figure 1:
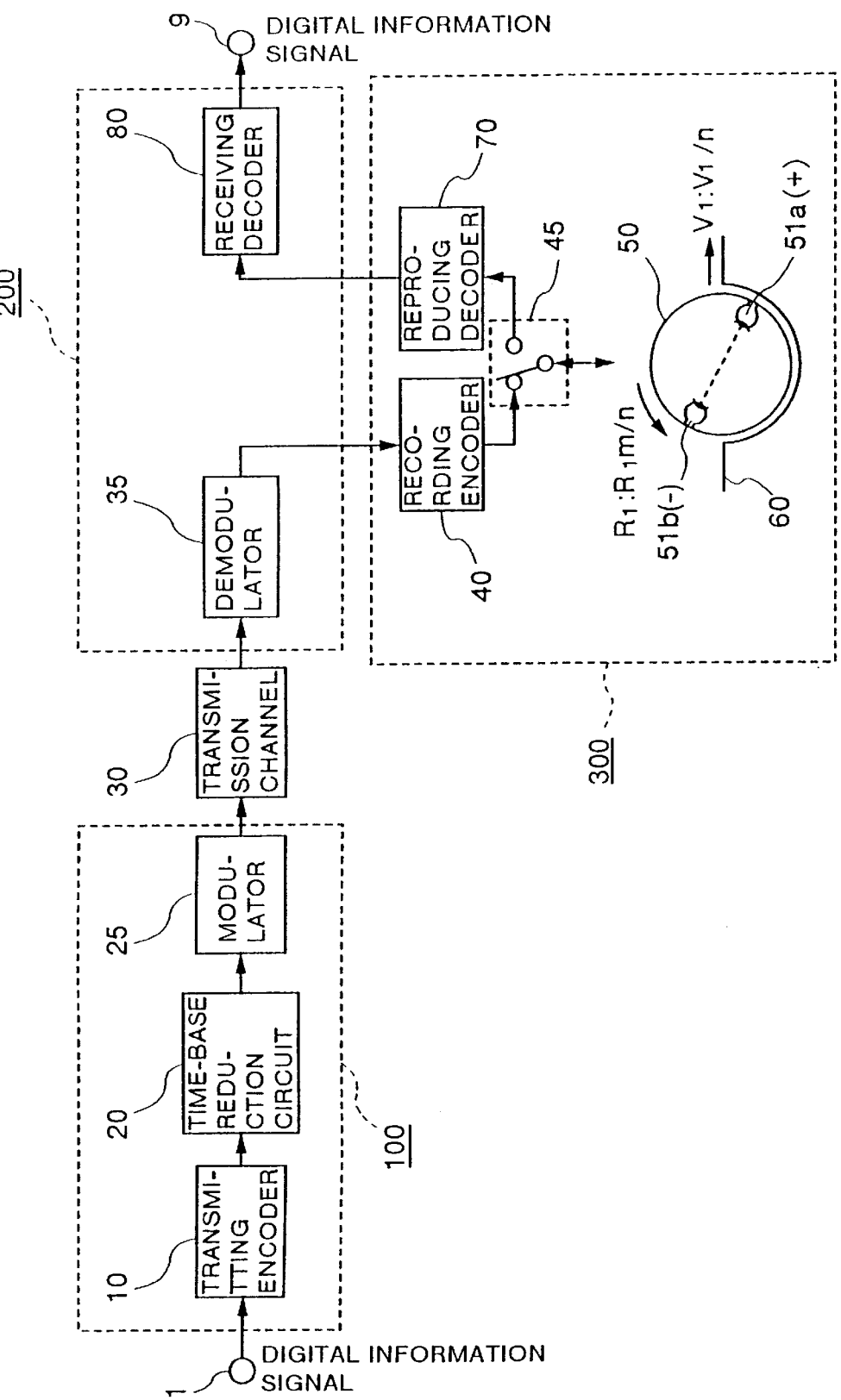
FIG. 1 is a block diagram showing a digital information recording-reproducing apparatus according to an embodiment of the invention.

A block diagram of a digital information recording-reproducing apparatus according to an embodiment of the invention is shown in FIG. 1. This apparatus roughly comprises a transmission system 100, a receiving system 200, and a recording-reproducing system 300. Numeral 1 designates an input terminal, numeral 10 a transmitting encoder, numeral 20 a time-base reduction circuit, numeral 25 a modulator, numeral 30 a transmission channel, numeral 35 a demodulator, numeral 40 a recording encoder, numeral 45 a change-over switch, numeral 50 a rotary drum, numerals 51a, 51b magnetic heads, numeral 60 a magnetic tape, numeral 70 a reproducing decoder, numeral 80 a receiving decoder, and numeral 9 an output terminal. In the magnetic heads 51a 51b, (+) designates a positive azimuth, and (−) a negative azimuth.

In the transmission system 100 shown in FIG. 1, the digital information signal inputted from the input terminal 1 is encoded in a predetermined format by the transmitting encoder 10. The signal thus encoded is reduced temporally to 1/n by the time-base reduction circuit 20 to increase the transmission rate by n times, followed by modulation at the modulator 25. The signal thus modulated is sent out on the transmission channel 30.

In the receiving system 200, the signal received through the transmission channel 30 is demodulated at the demodulator 35. The signal thus demodulated is applied as it is to the recording encoder 40 of the recording-reproducing system 300 directly. The signal thus applied is encoded by the recording encoder 40 in a format suitable for recording and reproduction.

Figure 2:
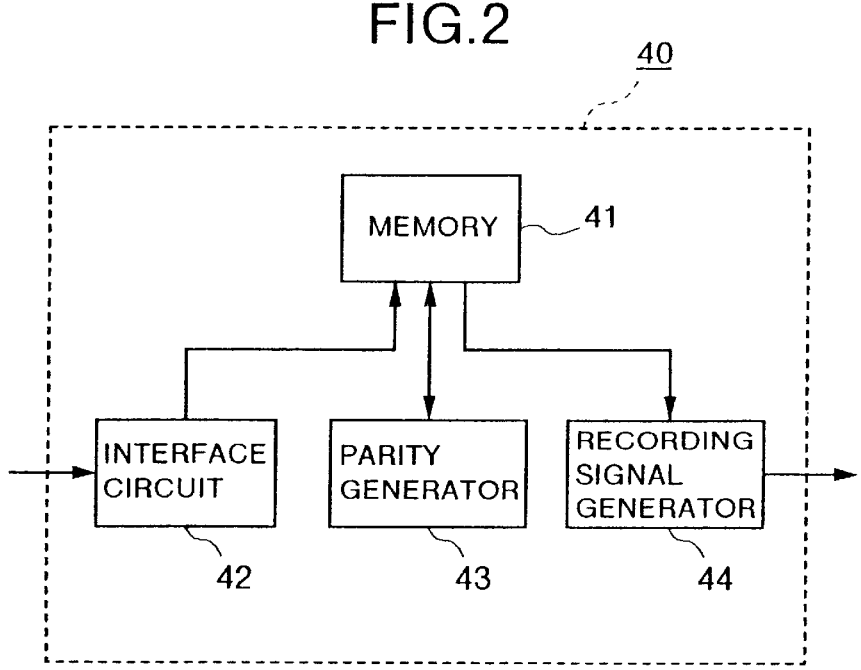
FIG. 2 is a block diagram showing an example configuration of a recording encoder according to the invention.
Figure 3:
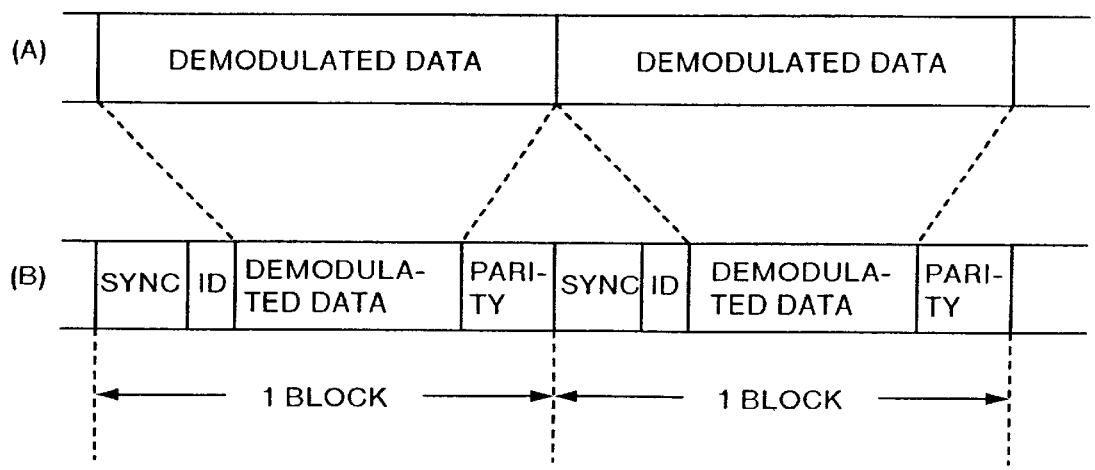
FIG. 3 is a diagram showing input and output signals of the recording encoder shown in FIG. 2.
Figure 4:
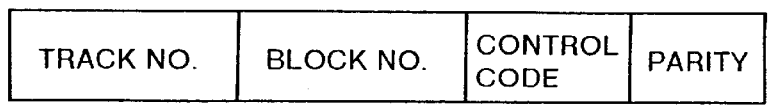
FIG. 4 is a diagram showing an example configuration of an ID signal.

A block diagram representing an example configuration of the recording encoder 40 is shown in FIG. 2. Numeral 41 designates a memory, numeral 42 an interface circuit, numeral 43 a parity generator, and numeral 44 a recording signal generator. In FIG. 2, the data demodulated at the demodulator 35 of the receiving system 200 is stored first in the memory 41 through the interface circuit 42. The demodulated data is shown in (A) of FIG. 3. The parity generator 43 generates a parity from the demodulated data stored in the memory 41, and the parity thus generated is stored in the memory 41. The recording signal generator 44 reads the parity and the demodulated data from the memory 41, and adding a sync signal and an ID signal, produces a signal in block form as shown in (B) FIG. 3. FIG. 4 shows an example configuration of the ID signal constructed of, for example, a track number for identifying the recording rack, a block number for identifying the in-track position, a control code such as the program number or the recording time on the tape, and a parity for detecting and correcting an error of the ID signal.

Figure 5:
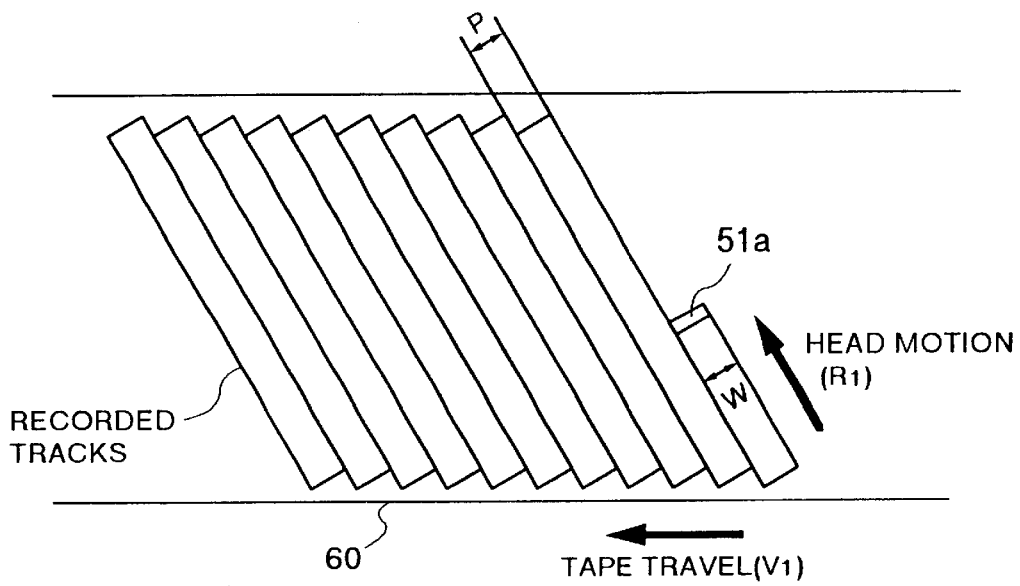
FIG. 5 is a diagram showing a recording track pattern according to the embodiment shown in FIG. 1.

The signal thus encoded for the recording system is applied to the magnetic heads 51a, 51b mounted at 180 degrees to each other on the rotary drum 50 and is recorded in azimuth on the magnetic tape 60. Assume that the rotation speed of the rotary drum 50 is $R_1$ and the traveling speed of the magnetic tape 60 is $V_1$. This recording track pattern is shown in FIG. 5. Character P designates a track pitch, and character W the width of the magnetic heads 51a, 51b. According to the embodiment under consideration, the head width W is set larger than the track pitch P at, say, 1.5 times as large as the track pitch P.

At the time of reproduction, the rotary drum 50 is rotated at a speed of $R_1 \times m/n$, that is, m/n times ($1<m\leq n$) the rotational speed for recording, the magnetic tape 60 is run at a speed of $V_1/n$ that is 1/n times the speed for recording, and the signal thus recorded is reproduced by the magnetic heads 51a, 51b.

Figure 6:
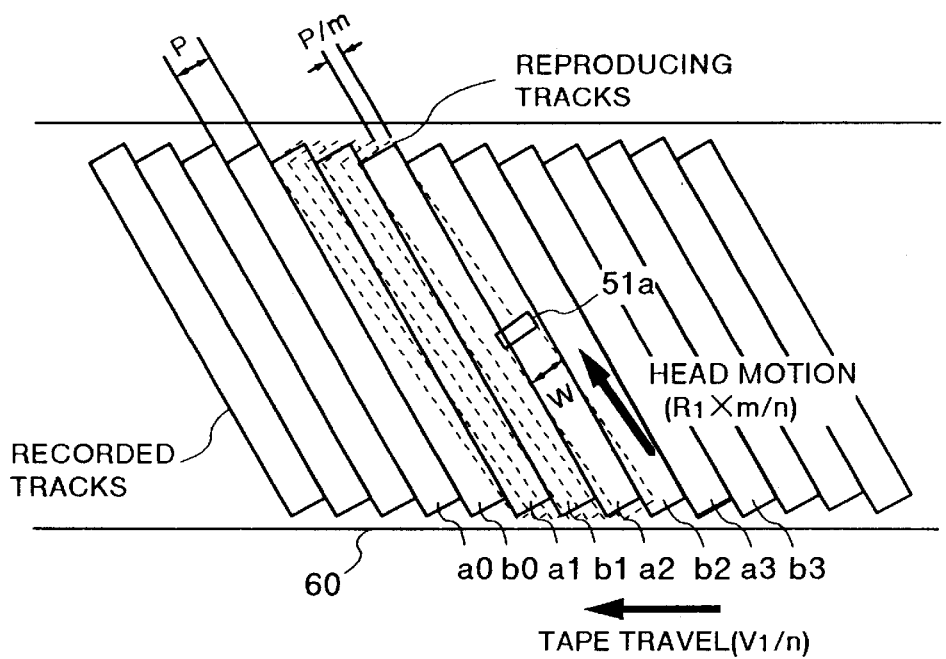
FIG. 6 is a diagram showing a reproducing track pattern according to the embodiment shown in FIG. 1.

FIG. 6 is a diagram showing the reproducing track pattern, in which the solid line represents a recorded track pattern and the dashed line a scanning trace of the magnetic heads 51a, 51b. In this way, the rotary drum 50 is rotated at a speed of $R_1 \times m/n$ that is m/n times the rate for recording and the magnetic tape 60 is run at a speed of $V_1/n$ that is 1/n times the rate for recording. Therefore, the scanning pitch of the magnetic heads 51a, 51b is 1/m times the track pitch P. In spite of a small deviation of the scanning angle, therefore, substantially a number m of scans are effected per track. According to the present embodiment, m is assumed to be 3 for simplicity of explanation.

Figure 7:
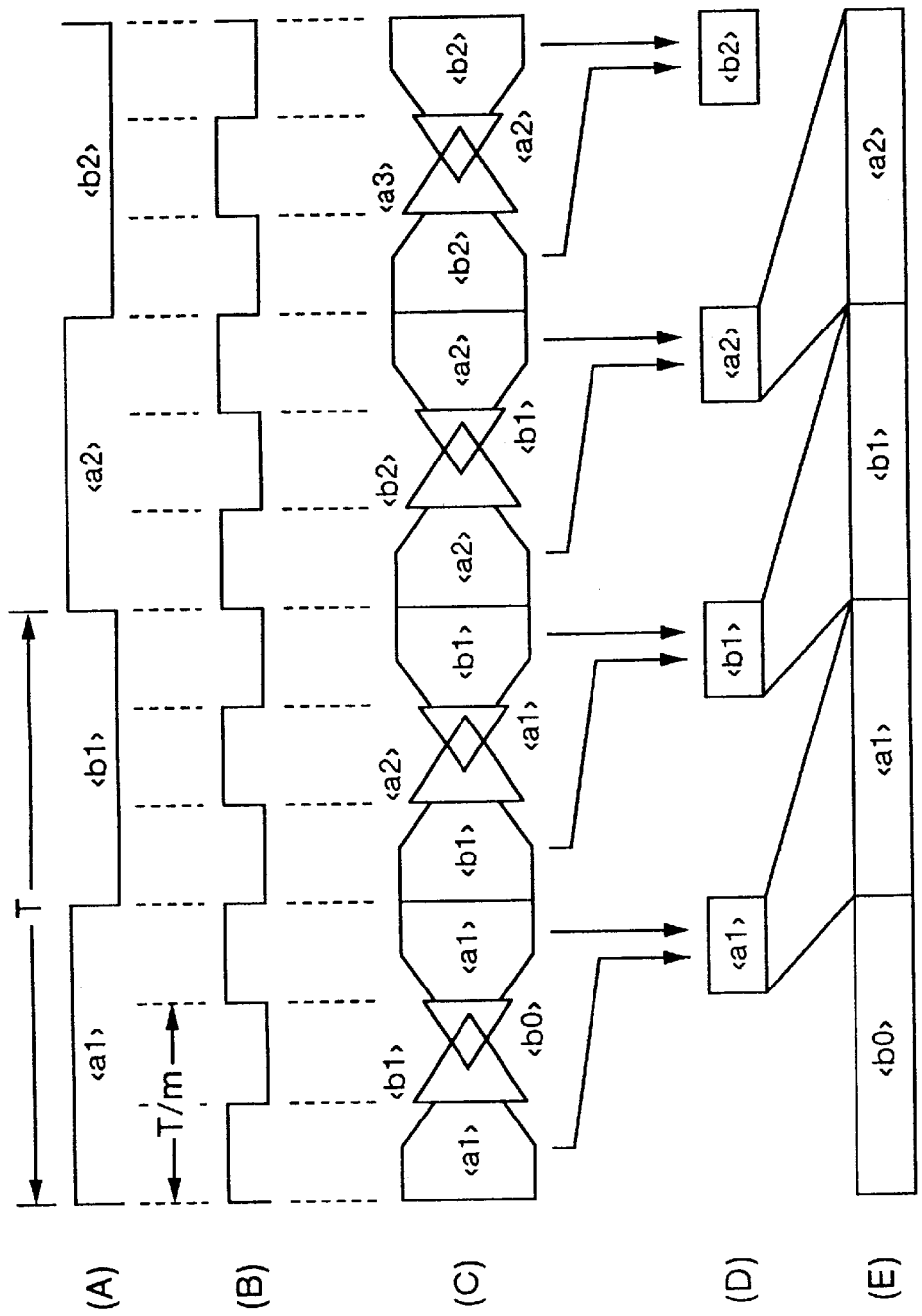
FIG. 7 shows waveforms representing the reproducing operation according to the embodiment shown in FIG. 1.

Waveforms representing the process for recovering signals from the number m of scans are shown in FIG. 7. In FIG. 7, (A) designates the timing of driving the rotary drum at the speed of $R_1/n$ that is 1/n times the speed for recording. In this case, signals $a_0$, $b_0$, $a_0$, $b_1$, $a_2$, $b_2$, $a_3$, $b_3$ are assumed to be reproduced in that order. Character T designates the rotational period. Character (B) designates the timing of rotation at the speed of $R_1 \times m/n$ (m=3) according to the present embodiment, and (C) an envelope of the signal reproduced by the magnetic heads 51a, 51b. In this way, three scans are effected per track. Also, as described above, the width W of the magnetic heads 51a, 51b is set to 1.5 times the track pitch P. Even when the scanning angle deviates from the recording track angle, therefore, the on-track condition is secured for the most part. The signal with the highest reproduction output level is retrieved, thereby producing the original data (waveform D). This data is restored to three times on time base to reproduce an intended low-speed signal (waveform E).

As seen from above, at the time of reproduction, the rotary drum 50 is driven at the speed m/n times higher than for recording, and the magnetic tape 60 is made to travel at the speed 1/n times higher than for recording. The time-base restoration n times larger is thus made possible.

Further, if the value m is set appropriately, a high reproduction frequency can be obtained and the desired reproduction output level can be secured regardless of the coefficient n of time-base restoration. Furthermore, the number m of scans per track permits data reproduction even under the off-track condition, thus eliminating the need of accurate tracking control.

Figure 8:
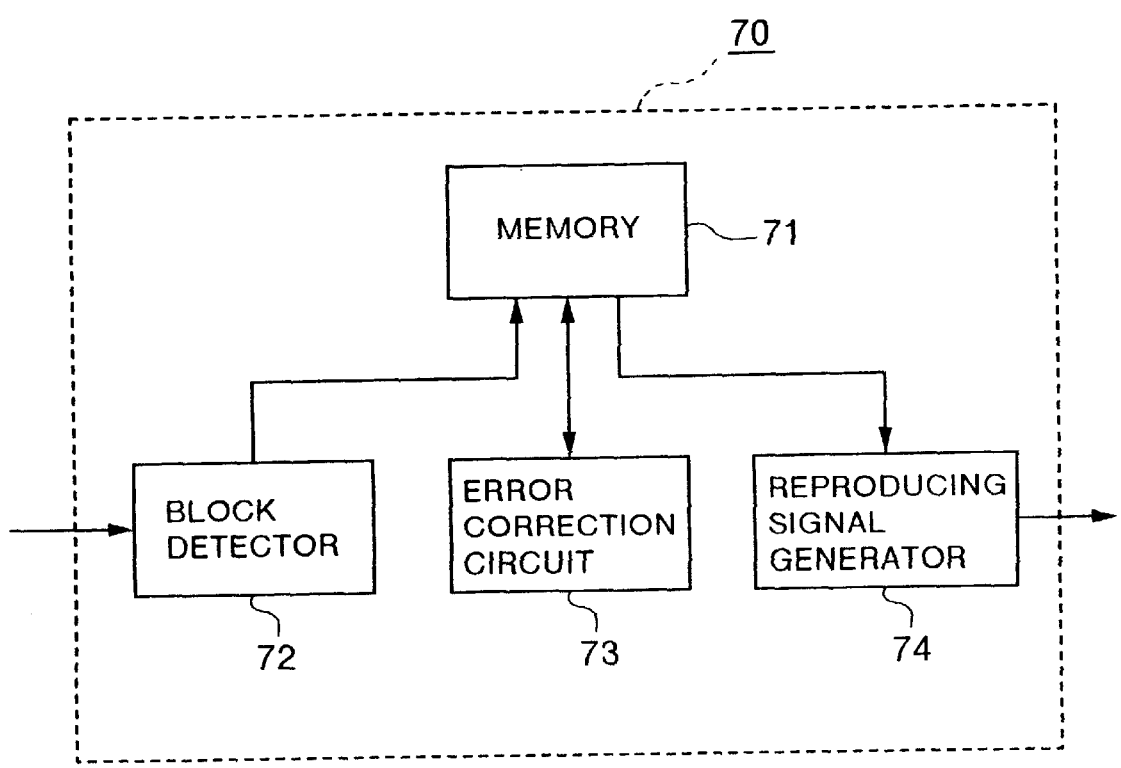
FIG. 8 is a block diagram showing an example configuration of a reproducing decoder according to the invention.

FIG. 8 is a block diagram showing an example configuration of a reproducing decoder 70 for processing the whole reproduction system including the process for retrieving the signal from the number m of scans described above. Numeral 71 designates a memory, numeral 72 a block detector, numeral 73 an error correction circuit, and numeral 74 a reproducing signal generator. In FIG. 8, the signal reproduced by the magnetic heads 51a, 51b is first applied to the block detector 72. The block detector 72 detects the sync signal and the ID signal, and stores them at a predetermined position in the memory 71 based on the track number and the block number in the ID signal. The error correction circuit 73 corrects the error in the reproduced data using the parity stored in the memory 71, while at the same time generating a pointer representing the error condition and storing it in the memory 71. In the process, the memory 71 is supplied with the data on the same track number and the block number a number m of times. The data with the best error state is finally stored by the pointer. The reproducing signal generator 74 reads the error-corrected data from the memory 71 in the order of the track numbers and the block numbers and produces the low-speed data restored on time base.

The low-speed data signal thus processed in the reproducing decoder 70 is applied to the receiving system 200 and decoded by the receiving decoder 80 at the transmission system. The signal thus decoded into the original digital information signal is outputted from the output terminal 9.

As described above, the receiving decoder 80 is acceptable as a low-speed processing device by being arranged in the last stage of the recording-reproducing system 300.

Figure 9:
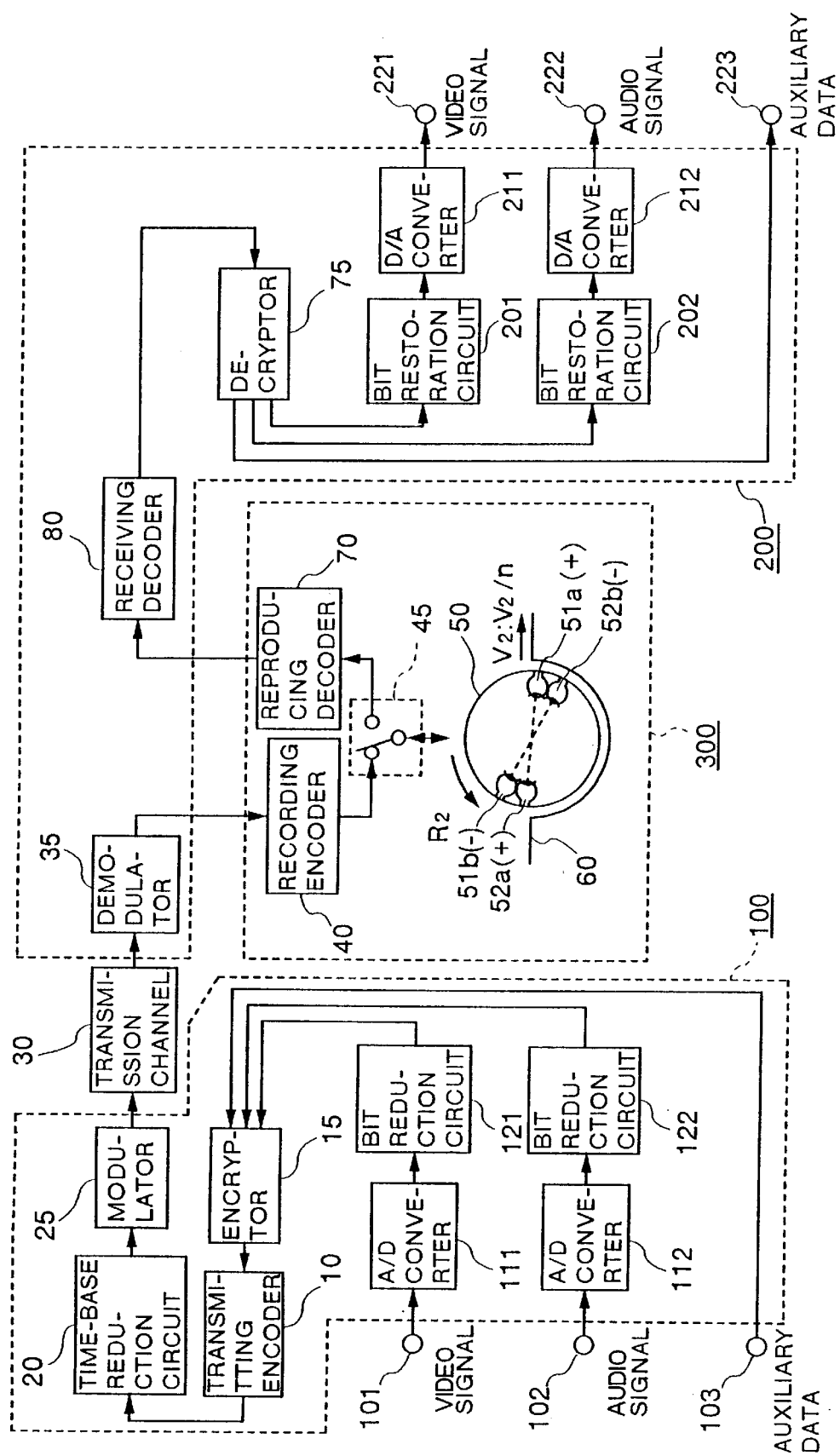
FIG. 9 is a block diagram showing a digital information recording-reproducing apparatus according to another embodiment of the invention.

A block diagram representing a digital information recording-reproducing apparatus according to another embodiment of the invention is shown in FIG. 9. This embodiment is an example of a system in which the video software is encrypted and transmitted as data recordable and reproducible only by the subscriber. In FIG. 9, numeral 15 designates an encryptor, numerals 52a, 52b magnetic heads, numeral 75 a decryptor, numerals 101, 102, 103 input terminals, numerals 111, 112 A/D converters, numerals 121, 122 bit reduction circuits, numerals 201, 202 bit restoration circuits, numerals 211, 212 D/A converters, and numerals 221, 222, 223 output terminals. Those component parts corresponding to those in FIG. 1 are designated by the same reference numerals respectively and will not be described below. In the magnetic heads 52a, 52b, (+) designates a positive azimuth, and (−) a negative azimuth.

In the transmission system 100, the video signal applied from the input terminal 101 is A/D converted by the A/D converter 111, and bit-compressed to an appropriate rate by the bit reduction circuit 122. The audio signal applied from the input terminal 102, on the other hand, is A/D converted by the A/D converter 112 and bit-compressed to an appropriate rate by the bit reduction circuit 122. These video and audio signals A/D-converted and bit-compressed, together with the auxiliary data applied from the input terminal 103, are encrypted and time-division multiplexed by the encryptor 15 and encoded by the transmitting encoder 10. The encrypted signal, as in the embodiment shown in FIG. 1, is compressed on time base to 1/n by the time-base reduction circuit 20, modulated by the modulator 25, and sent out to the transmission channel 30.

The receiving system 200, like in the embodiment shown in FIG. 1, demodulates the signal received through the transmission channel 30 by the demodulator 35, and applies the demodulated data to the recording encoder 40 of the recording-reproducing system 300.

The recording-reproducing system 300 encodes the demodulated data through the recording encoder 40, which data is supplied through the change-over switch 45 to two sets of magnetic heads 51a, 51b and 52a, 52b, and recorded in the magnetic tape 60 by 2-channel azimuth. The 2-channel recording using the two sets of magnetic heads 51a, 51b, 52a, 52b can reduce the recording frequency to one half. The rotational speed of the rotating drum 50 and the travel speed of the magnetic tape 60 are set, for example, at $R_2$ and $V_2$ respectively.

At the time of reproduction, the rotary drum 50 is rotated at the same rate $R_2$ as for recording (i.e., m=n). The magnetic tape 60 is run at the rate of $V_2/n$ that is 1/n the rate for recording, and the signal thus recorded is reproduced by a set of magnetic heads 51a, 51b. According to this embodiment, the coefficient n for time-base reduction is set sufficiently large (the larger the value n, the better). In view of the fact that a number n/2 of tracings per track is possible even for 1-channel reproduction by the magnetic heads 51a, 51b, sufficient data reproduction is possible by the same processing through the reproducing decoder 70 as in the embodiment of FIG. 1. As a result, a single channel of reproducing circuit serves the purpose, thereby reducing the circuit size. Also, since the rotary drum 50 is driven at the same speed as at the time of recording, the rotation control is simplified.

The receiving system 200 receives the signal decoded by the reproducing decoder 70, decodes through the receiving decoder 80 the signal encoded at the transmission system, decrypts through the decryptor 75 the signal encrypted at the transmission system, and thus separates the video signal, the audio signal and auxiliary data. The video signal and the audio signal thus separated are expanded into the original bit rate by the bit restoration circuits 201, 202, D/A converted by the D/A converters 211, 212, and outputted from the output terminals 221, 222. Also, the auxiliary data thus separated are outputted from the output terminal 223.

In this way, the video signal and the audio signal thus recorded are protected by arranging the decryptor 75 in the last stage of the recording-reproducing system 300.

TABLE 1

| Video rate (after bit reduction) | 2.5 Mbps |
|---|---|
| Audio rate (after bit reduction) | 256 kbps (2 ch) |
| Auxiliary data rate | 256 kbps |
| Total bit rate (after encoding) | 4 Mbps |
| Time-base compression rate | 1/6 (n = 6) |
| Transmission rate after time-base reduction | 24 Mbps |
| Modulation method | 32 QAM |
| Transmission channel | Cable (bandwidth 6 MHz) |

Table 1 shows a specific example of the transmission specification of the transmission system 100 according to the embodiment shown in FIG. 9. Assuming that the post-compression video bit rate is 2.5 Mbps, the post-compression audio bit rate is 256 kbps, and the auxiliary data bit rate is 256 kbps, for example, the total bit rate after transmission encoding is about 4 Mbps. With this bit rate compressed on time base to 1/6 (n=6), the transmission rate is 24 Mbps. Assuming also that the CATV cable is a transmission channel, the bandwidth per TV channel is 6 MHz. If a signal of 24 Mbps in transmission rate is to be transmitted within the bandwidth of 6 MHz, the optimum modulation system is 32 QAM (Quadrature Amplitude Modulation).

Instead of the CATV cable used for the transmission channel in Table 1 above, a communication satellite may be used for a QPSK (Quadrature Phase Shift Keying) modulation system. In such a case, the bandwidth of the communication satellite is about 30 MHz per channel of the transponder, and therefore the transmission rate of about 48 Mbps is available. As a result, with the same bit rate as in Table 1, two sustaining program software can be transmitted simultaneously by time-division multiplexing. Alternatively, the bit rate may be increased twice (with the bit rates of the reduced image and voice as 5 Mbps and 512 kbps respectively and the bit rate for auxiliary data as 512 kbps) to improve the video and audio quality. Conversely, the transmission time may be shortened by time-base reduction to 1/12 (n=12).

TABLE 2

|  | Example 1 | Example 2 |
|---|---|---|
| Input bit rate | 24 Mbps | 24 Mbps |
| Recording bit rate (after coding) | 36 Mbps | 36 Mbps |
| Number of recording channels | 2 | 2 |
| Tape width | 1/2 in. | 8 mm |
| Tape material | Metal-oxide | Metal-evaporated |
| Drum diameter | 62 mm | 40 mm |
| Drum rotation speed (recording) | 1800 rpm | 1800 rpm |
| Tape speed (recording) | 66.7 mm/s | 28.69 mm/s |
| Track pitch | 58 μm | 20.5 μm |
| Drum rotation speed (reproduction) | 1800 rpm | 1800 rpm |
| Tape speed (reproduction) | 11.12 mm/s | 4.78 mm/s |

Table 2 shows specific examples of the specifications of the recording-reproducing system 300 corresponding to the transmission specifications shown in Table 1 according to the embodiment of FIG. 9. Example 1 represents the case using an metal-oxide tape 1/2 in. wide, and Example 2 the case using a metal-evaporated tape 8 mm wide. The input bit rate is 24 Mbps in transmission rate as shown in Table 1, and the recording bit rate after the encoding in the recording system is about 36 Mbps. With two-channel recording, the recording rate is 18 Mbps per channel. In Example 1, the drum diameter is assumed to be 62 mm, and the recording drum rotation speed and the tape speed 1800 μpm and 66.7 mm/s respectively. The related track pitch is 58 μm, and the recording wavelength is about 0.64 gm. The use of a high-performance metal-oxide tape, therefore, can achieve a sufficient reproducing signal level. In Example 2, on the other hand, the drum diameter is assumed to be 40 mm, the recording drum rotation speed and the tape speed to be 1800 rpm and 28.69 m/s, respectively. Then the track pitch is 20.5 μm. Under this condition, the recording wavelength is as short as about 0.42 μm, but a sufficient reproducing signal level can be secured by using the metal-evaporated tape. In both Examples 1 and 2, the reproducing drum rotation speed is the same 1800 rpm as for recording, while the tape speed is of course set to 11.12 mm/s and 4.78 mm/s respectively, which are 1/6 the corresponding figures for recording.

In the receiving system 200, the signal received through the transmission channel 30 is demodulated at the demodulator 35. The signal thus demodulated is applied as it is to the recording encoder 40 of the recording-reproducing system 300 directly. The signal thus applied is encoded by the recording encoder 40 in a format suitable for recording and reproduction.

Figures 10, 11:
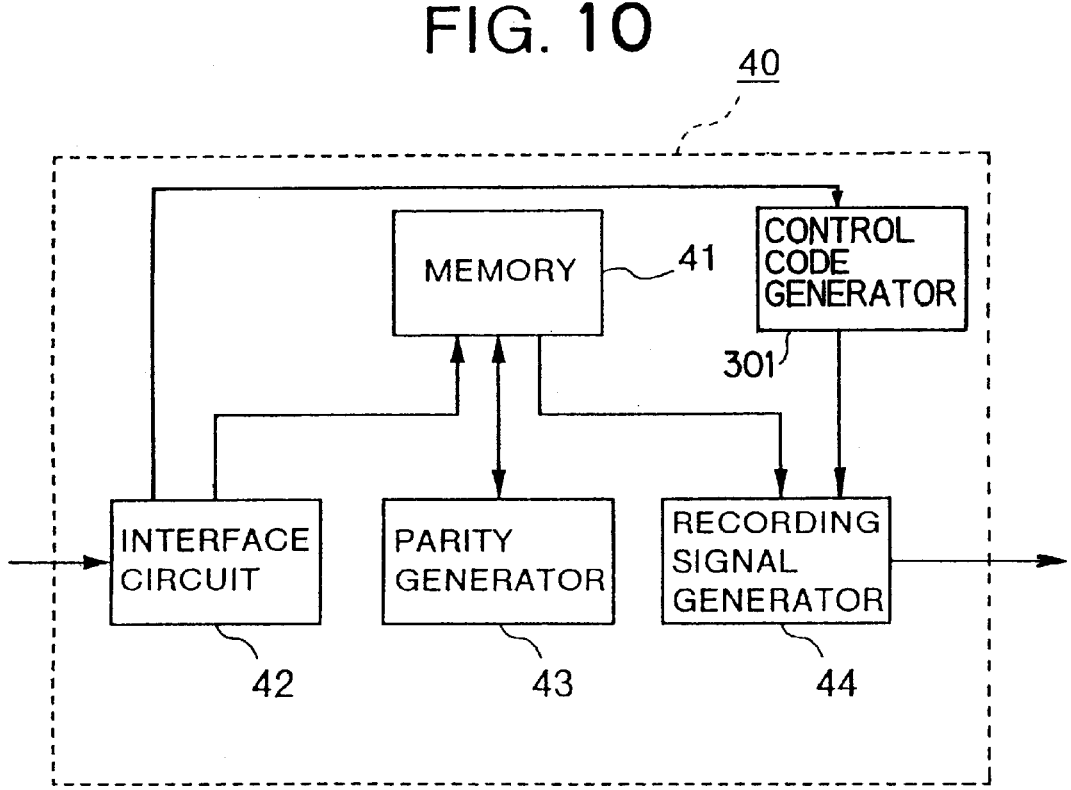
FIG. 10 is a block diagram showing an example configuration of a recording encoder according to the invention.
FIG. 11 is a diagram showing an example configuration of a control signal.

A block diagram representing an example configuration of the recording encoder 40 is shown in FIG. 10. Numeral 41 denotes a memory, numeral 42 an interface circuit, numeral 43 a parity generator, numeral 44 a recording signal generator, and numeral 301 a control code generator. In FIG. 10, the data demodulated at the demodulator 35 of the receiving system 200 is stored first in the memory 41 through the interface circuit 42. The demodulated data is shown in (A) of FIG. 3. The parity generator 43 generates a parity from the demodulated data stored in the memory 41, and the parity thus generated is stored in the memory 41. The recording signal generator 44 reads the parity and the demodulated data from the memory 41, and adding a sync signal and an ID signal including the control code generated at the control code generator 301, produces a signal in block form as shown in FIG. 3(B). FIG. 4 shows an example configuration of the ID signal constructed of, for example, a track number for identifying the recording track, a block number for identifying the in-track position, a control code such as the program number or the recording time on the tape, and a parity for detecting and correcting an error of the ID signal.

A configuration of the control signal is shown in FIG. 11. The "program number" is information indicating the order of a program in the tape, and the "time code" indicates the lapse of time in the program and tape. The "type" is information indicating whether the digital information signal recorded is sold or rented. This information may be subdivided in accordance with whether the information is sold only to a specific user or the number of days rented. The "recording date+time" is the date and time recorded, and the "user No." a user registration number recorded, which are both stored in the receiving system 200 or the recording-reproducing system 300.

Figure 12:
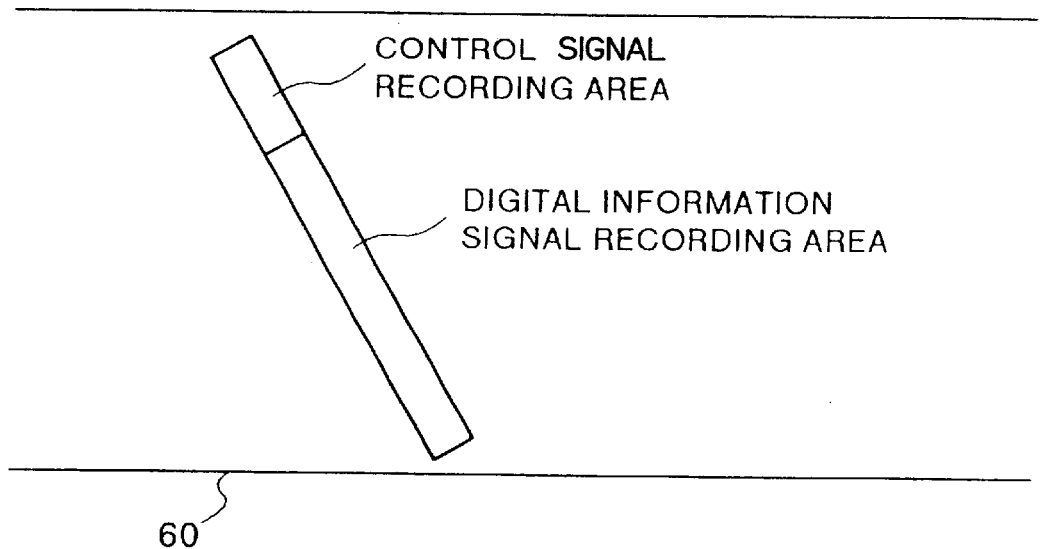
FIG. 12 is a diagram showing a control signal recording system according to another embodiment.

The control code can be recorded by being distributed in a plurality of blocks to reduce the redundancy. Also, as shown in FIG. 12, the control code may be recorded in a region different from the digital information signal. In such a case, the blocks are configured the same way as the digital information signal recording region, and the control code is recorded in the part where the demodulated data of (B) of FIG. 3 is recorded. The control code may be written several times for an improved reliability.

In the case where the user desiring the service of sale or rental of a digital information signal proposes to the transmitting end, the transmitting end sends to the receiving end the digital information signal together with the user number and the additional information indicating the sale or rental. The receiving end discriminates the user number in the additional information at the recording-reproducing system 300, and when they are coincident, records the information. In the process, the sale or rental is discriminated by the additional information and recorded as type information in the control code.

According to a further embodiment of the invention, at the time of reproduction, the rotating drum 50 is driven at the same rate RI as at the time of recording; the magnetic tape 60 is fed at the rate of $V_1/n$ that is 1/n times the rate for recording, and the signal thus recorded is reproduced by the magnetic heads 51a, 51b.

Figure 13:
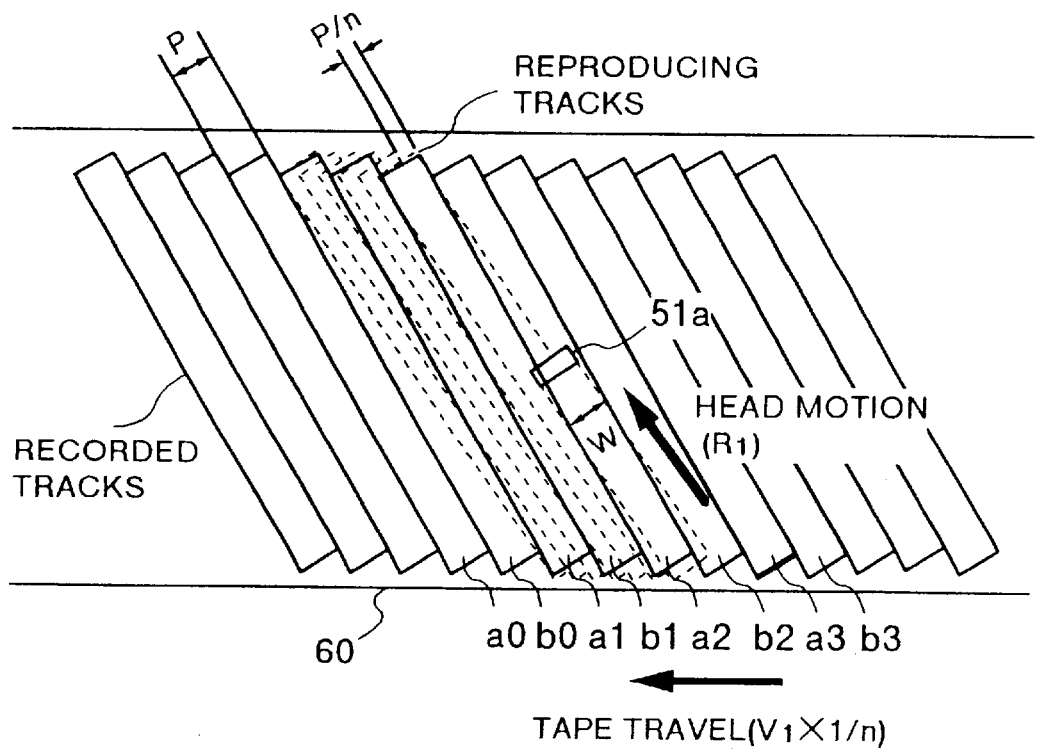
FIG. 13 is a diagram showing a reproducing track pattern according to still another embodiment of the invention.

FIG. 13 is a diagram showing a reproducing track pattern, in which the solid line represents a recorded track pattern and the dashed line the scanning traces of the magnetic heads 51a, 51b. In view of the fact that the rotating drum 50 is driven at the same rate $R_1$ as at the time of recording and the magnetic tape 60 is fed at the rate of $V_1/n$ that is 1/n times the rate for recording, the scanning pitch of the magnetic heads 51a, 51b is 1/n times the track pitch P. As a result, although the scanning angle is deviated to some degree, substantially a number n of scans are effected per track. According to the embodiment under consideration, n is assumed to be 3 for simplicity. Character W designates the width of the magnetic heads 51a, 51b. Normally, the head width W is set at, say, 1.5 times larger than the track pitch P.

Figure 14:
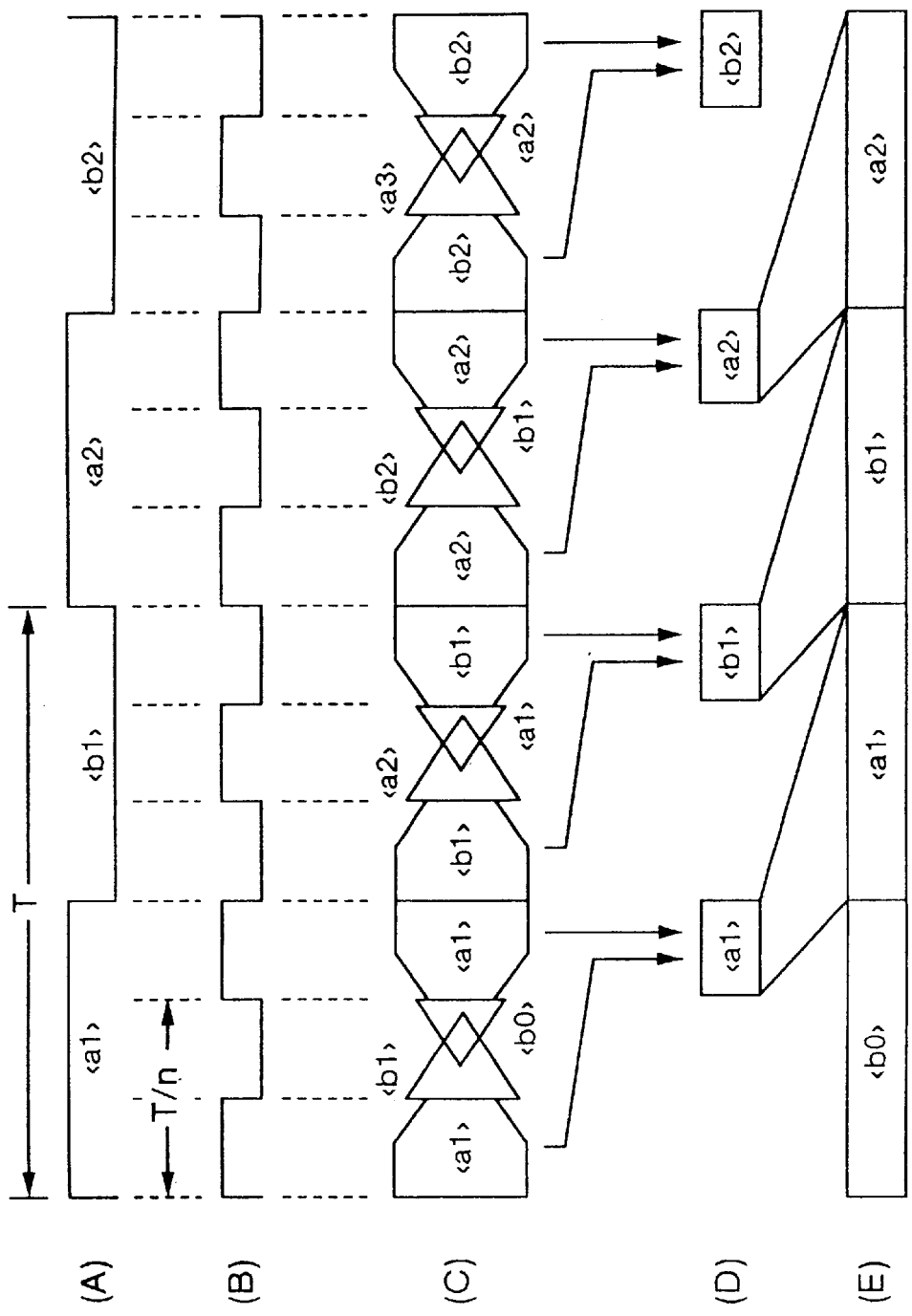
FIG. 14 shows waveforms representing the reproducing operation according to a further embodiment of the invention.

FIG. 14 shows waveforms representing the process of retrieving the signal from the number n of scans. In FIG. 14, (A) designates the timing with the rotary drum 50 driven at the conventional speed of $R_1/n$. In this case, signals $a_0$, $b_0$, $a_1$, $b_1$, $a_2$, $b_2$, $a_3$, $b_3$ are reproduced in that order. Character T designates the rotational period. Character (B) designates the timing of rotation made at the rate of $R_1$ (n=3) according to this embodiment. Character (C) designates an envelope of the signal reproduced by the magnetic heads 51a, 51b. As described above, three scans are made per track and also the width W of the magnetic heads 51a, 51b is set to 1.5 times larger than the track pitch P. Even when the scanning angle deviates from the recording track angle, therefore, the on-track condition is secured for a considerable part. As a result, the original data (waveform D) can be produced by retrieving the signal with the highest reproduction output level. By expanding this signal to three times on time base, the intended low-speed signal (waveform E) can be reproduced.

As seen from the above explanation, the reproducing frequency can be increased without reducing the coefficient n of the time-base reduction by driving the rotating drum 50 for reproduction at the same rate as for recording, thereby securing the desired reproduction output level. Also, the control of the rotary drum 50 is simplified. Further, because of the number n of scans per track, the data can be reproduced even under off-track conditions, thereby eliminating the need of accurate tracking control.

A block diagram of an example configuration of the reproducing decoder 70 for processing the whole reproducing system is shown in FIG. 15. Numeral 71 designates a memory, numeral 72 a block detector, numeral 73 an error correction circuit, numeral 74 a reproducing signal generator, and numeral 302 a control signal detector. In FIG. 15, the signal reproduced by magnetic heads 51a, 51b is first applied to the block detector 72. In the block detector 72, a sync signal and an ID signal are detected and stored in a predetermined position on the memory 71 in accordance with the track number and the block number in the ID signal. The error correction circuit 73 corrects an error, if any, in the reproduced data using the parity stored in the memory 71, while at the same time generating a pointer indicating the error condition and storing the pointer in the memory 71. In the process, although the same data on the track number and the block number are stored a number n of times in the memory 71, the data in the best error condition is finally stored by the pointer. In the reproducing signal generator 74, the error-corrected data stored in the memory 71 is read out in the order of the track number and the block number thereby to produce low-speed data expanded on time base.

The low-speed data thus decoded for the reproducing system is sent to the receiving system 200 thereby to resolve the coding made at the transmitting system. The signal thus decoded to the original digital information signal is produced from the output terminals 221, 222, 223.

In this way, the receiving decoder 80 is arranged not before but after the recording-reproducing system 300, so that the receiving decoder 80 permits low-speed processing.

The control signal detector 302 identifies the control code and decides whether the reproduction is to be carried out. In the case of sold information, for example, when the user number is coincident, the information can be reproduced only by the apparatus that was used for recording but not by any other apparatuses. With information on rental, by contrast, the recording data and the rental period are compared, and if the rental period has passed, the information is prevented from being reproduced. This control operation can be alternatively performed by the receiving system 200, in which case the control signal that has been reproduced at the recording-reproducing system 300 is applied to the receiving system 200.

FIG. 16 shows a configuration of the control signal according to the embodiment of FIG. 9. The encrypt information is the one required for decryption. Normally, this information is stored in the receiving system 200. This encrypt information is stored as control code, and the encrypt information reproduced at the time of reproduction is applied to the receiving system 200 to perform decryption. Even when the encryption is changed, the recorded information can thus be reproduced.

Also, in the case of rented information, the encryption is regularly changed so that no encrypt information is recorded in the control code. In this way, the information that has passed a predetermined length of time cannot be decrypted, thereby making it possible to manage the rental period.

In this configuration, it takes some time before the user wanting to view a video software requests and receives an actual video data signal. This is because the transmitter is required to prepare the video data to be transmitted or to stand by until a transmission channel becomes available. This leads to the problem of when the user can decide to start the recording-reproducing system 300. The recording-reproducing system 300, therefore, is desirably controlled by the video data transmitter.

Figure 17:
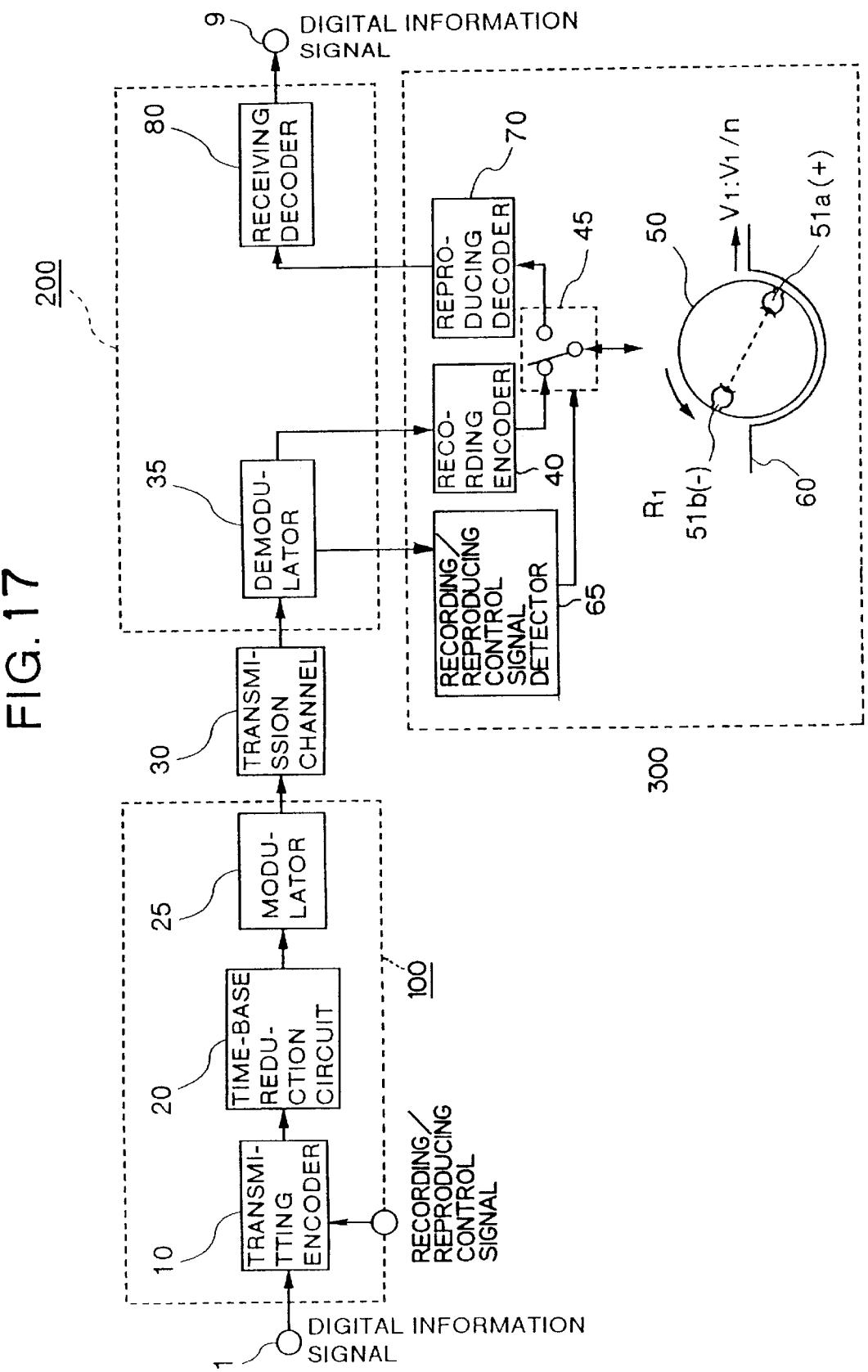
FIG. 17 is a block diagram showing a digital information recording-reproducing apparatus according to still another embodiment of the invention.

The embodiment shown in FIG. 17 represents an example of transmitting a recording-reproducing control signal multiplexed on the digital information signal transmitted by satellite or cable as a transmission channel. For example, a signal for setting the recording-reproducing system 300 to a recording (REC) stand-by mode (with the drum 50 rotated while the magnetic tape 60 kept stationary) is supplied from the recording-reproducing control signal input terminal 2 approximately two minutes before transmitting a video signal actually to be recorded, and through the modulator 25 and the transmission channel 30, is transmitted together with the ID code for identifying the receiving home and the recording-reproducing system 300. The demodulator 35 that has received this signal sends out the received data to the recording-reproducing control signal detector 65, and sets the change-over switch 45 of the recording-reproducing system 300 to the REC stand-by state.

Next, a signal for setting the recording-reproducing system 300 to REC state is sent out about one second before transmission of the digital information signal, and the recording-reproducing control signal detector 65 sets the recording-reproducing system 300 in REC mode. The digital information signal is thus recorded in the magnetic tape 60. Also, at the termination of the digital information signal, a stop signal is immediately transmitted thereby to stop the recording-reproducing system 300.

If the user confirms that the magnetic tape 60 has been inserted into the recording-reproducing system 300 in this configuration, then the remaining operation is performed by the recording-reproducing system 300 under the control of the transmission system 100. The recording operation can therefore be performed positively without any special manipulation. This control data is in one of the three modes including (1) REC stand-by, (2) REC and (3) stop, and therefore is constituted by two bits at most. Further, the transmitting time is not limited to the above-mentioned value.

FIG. 18 shows a transmission data format according to an embodiment of the invention. In FIG. 18, a block is comprised of a sync signal, ID data, a parity associated with the ID data, a digital information signal to be recorded and an error correction code for the digital information signal. This block is commonly used and similar to the one used for PCM voice for BS or DAT (Digital Audio Tape).

As seen from FIG. 18, the recording-reproducing control signal described above, together with the home and recording-reproducing (VTR) ID signal (user code), is applied to the ID data section. In the process, the recording-reproducing control signal might be recorded if the recording format shown in FIG. 3 is employed. It is however possible to prevent only the control signal from being recorded by the recording signal generator 44. Even if the control signal has been recorded, the reproducing decoder 70 can be controlled in such a manner as to ignore the particular signal at the time of reproduction.

Figure 19:
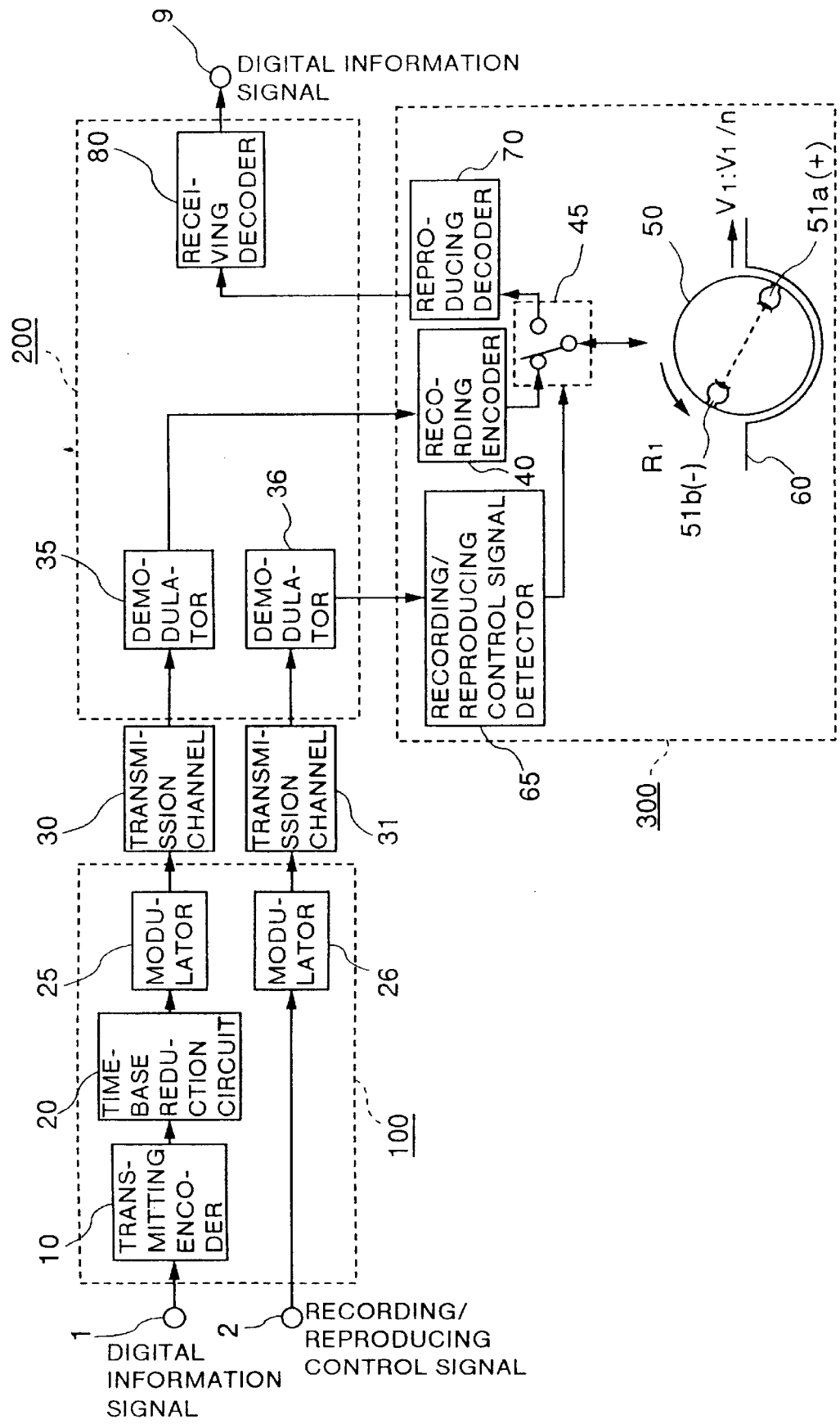
FIG. 19 is a block diagram showing a digital information recording-reproducing apparatus according to still another embodiment of the invention.

FIG. 19 is a block diagram showing another embodiment of the invention. In FIG. 19, the same component parts as those in FIG. 17 are designated by the same reference numerals respectively. Numeral 26 designates a modulator, numeral 31 a transmission channel, and numeral 36 a demodulator. This embodiment is different from that of FIG. 17 in that the recording-reproducing control signal is transmitted through a telephone line represented by the transmission channel 31, for example, and comprises a dedicated modulator 26 and a dedicated demodulator 36. The actual transmission data, as described with reference to the embodiment shown in FIG. 17, has two-bit information. In the embodiment shown in FIG. 19, no extraneous signal is superimposed on the transmission channel 30 for transmitting the digital information signal, and therefore the hardware of the transmitting system is simplified. Also, the modulator 26 and the demodulator 36 can be of low-speed type.

In the case where the telephone line is used as the transmission channel 31 in the embodiment under consideration, however, the channel connection time of about two seconds is required. Also, when the channels are very much congested, the recording-reproducing system 300 may not be instantaneously switched to REC mode. For this reason, the information predicting the recording time is preferably transmitted at the time of transmitting a REC stand-by signal about two minutes before the digital information signal as mentioned above, so that the recording-reproducing system 300 may be set to REC mode just at the time of starting the transmission of the digital information signal. The timer built in the recording-reproducing system 300 can of course be synchronized with the transmitting timer all the time or at the time of sending out the REC stand-by signal. This configuration increases the amount of information controlled for the recording-reproducing system 300 transmitted through the transmission channel 31. The recording-reproducing system 300, however, can thus be positively controlled to REC stand-by, REC or stop state by the transmitting end. This method can of course be applied also to the embodiment shown in FIG. 17.

The use of the telephone line as the transmission channel 31 permits the bidirectional reception according to the embodiment shown in FIG. 19. The operating conditions of the recording-reproducing system 300 can thus be decided at the transmitting end. Once a modulator and a demodulator are provided at the receiving and transmitting ends respectively, therefore, an alarm can be issued to the user any time the recording-reproducing system 300 in malfunction. As a result, the recording operation can be performed more accurately than according to the embodiment shown in FIG. 1.

As far as the recording-reproducing system 300 shown in FIGS. 1 and 19 is controlled appropriately, the recording-reproducing system 300 proper may comprise only a change-over switch operated by the user for switching three modes of reproduce, fast forward feed and rewind. The apparatus can thus be operated in very simple manner.

Figure 20:
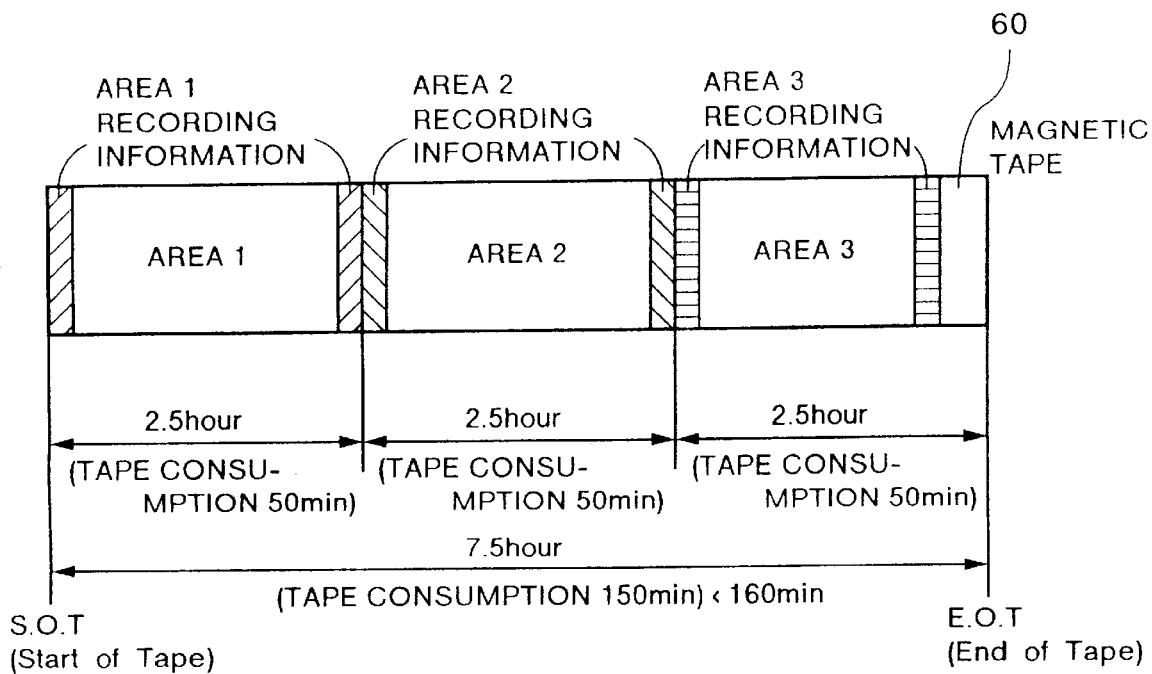
FIG. 20 is a diagram showing divisions of the magnetic tape into areas according to another embodiment.

FIG. 20 is a diagram showing an example of the recording format for the magnetic tape 60 used with the recording-reproducing system 300. In FIG. 20, the magnetic tape 60 is divided into three areas along the longitudinal direction, for example, thereby to permit continuous recording of three types of video software.

Assuming that another set of magnetic heads 51*a*, 51*b* is added to provide two channels with n of 6, the recording of two-hour (120-minute) software requires the consumption amount of the magnetic tape 60 equivalent to 40 minutes for the conventional VTR. Generally, each movie software is less than two and half hours, and therefore a 50-minute recording area is required for each such software. If the 160-minute tape sold on the market is used, on the other hand, three pieces of software can be continuously recorded.

In the embodiment shown in FIG. 20, the magnetic tape 60 is preformatted and the intended information is recorded at the heads of the three recording areas 1, 2 and 3 into which the magnetic tape 60 is divided. These information include the area number, the recording time, the recording date, and if required, the title. Further, the heads of the areas 2 and 3 have recorded therein the recording time and date of the digital information signal respectively for the preceding area respectively.

Explanation will be made about the case in which three types of software are recorded at different dates and times. Normally, the digital information signal is recorded in the areas 1, 2 and 3 in that order. Upon completion of recording up to the area 3, the magnetic tape 60 is rewound and then the area 1 is recorded. At the same time, the recording date in the head and tail portions of the area 1 is read. In the case where the digital information signal in the area 1 is still in the valid period, the magnetic tape 60 is fed fast forward. The recording date in the area 2 is then referenced, and if it is within the valid period, the record mode is provisionally cancelled and an input from the user is awaited. Even when the valid period for the software recorded still remains unexpired, if the particular software is not required, the user sets the recording-reproducing system 300 to REC mode thereby to record in the area 1 or 2. If the entire software is still needed, on the other hand, the magnetic tape 60 is changed. This operation is performed in REC stand-by mode.

The area-divided configuration of the tape allows uniform access to the three areas. The resulting effect is to disperse tape damage and lengthen the service life of the magnetic tape 60. Thus the user is not required to unload the magnetic tape 60 frequently from the recording-reproducing system 300 paying attention to the residual volume of the magnetic tape 60, thereby improving the mechanical reliability. Also, since the record-start position is known in advance, the search is effected at very high speed. Further, the recording-reproducing system 300 can be controlled in simple manner for a lower hardware cost.

In the above-mentioned configuration, two areas are used for a digital information signal exceeding two and half hours in recording time. As shown in FIG. 20, the record information can be accommodated not in the tail portion of the area 3 but may be in the portion immediately following the digital information recording section. In similar fashion, the record information for the areas 1 and 2 may be accommodated in the portion immediately following the digital information signal recording section of each area.

These recording time and recording date signals may be accommodated in the ID section indicated in FIG. 4. Generally, however, the magnetic tape 60 is often in stationary state at the end of viewing a software. The use of the format described in FIG. 20, therefore, quickens the search speed. Also, in the case where the user stops the magnetic tape 60 in the middle of an area, the magnetic tape 60 is fed fast forward or rewound to the record information section of the particular area.

Figure 21:
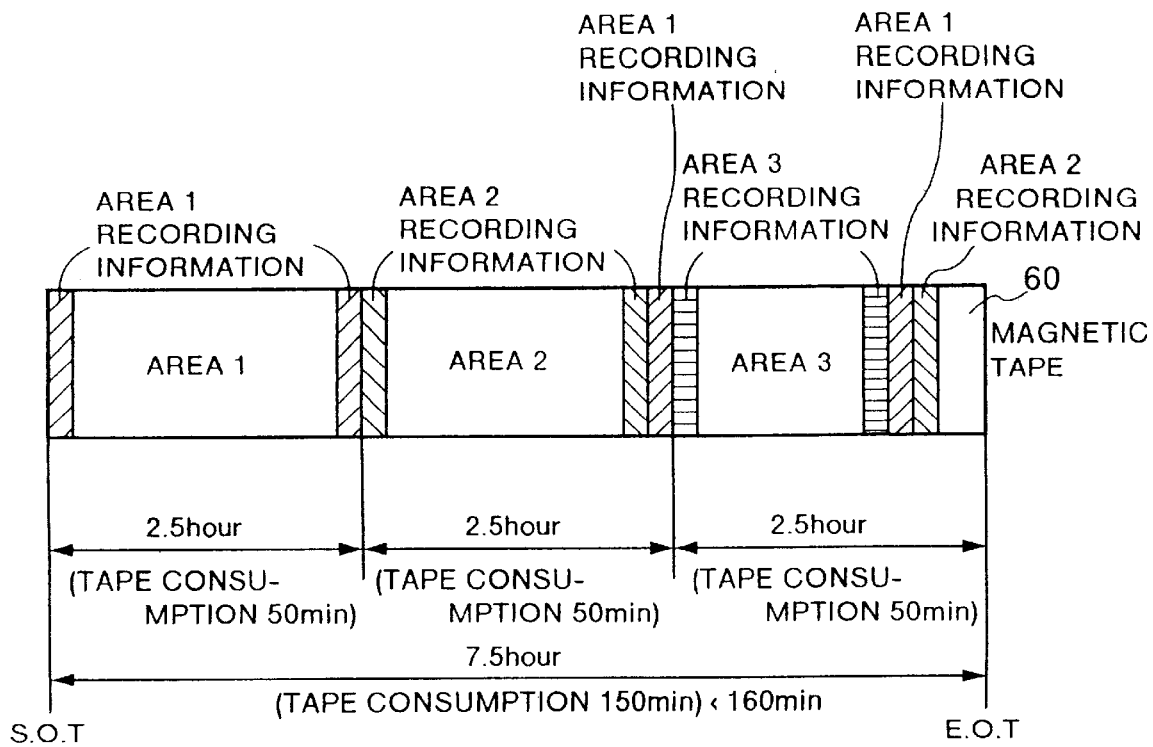
FIG. 21 is a diagram showing an arrangement of recording information signals according to a further embodiment.

FIG. 21 shows a magnetic tape format according to another embodiment. In this embodiment, the recording information is recorded in accordance with the format of FIG. 21 at the head of an area immediately before start of recording and at the head of the next area immediately after the end of recording. The feature of this format is that since the recording information for a different area is accommodated at the start of the areas 2 and 3, the search speed is further increased as compared with the embodiment shown in FIG. 20.

The area-divided system for the recording magnetic tape 60 is described above. In the recording-reproducing system 300 shown in FIGS. 1 and 19, however, the digital information signal may be recorded sequentially from the head of the magnetic tape 60 without dividing it into areas.

The area-recorded information is preferably recorded for about ten seconds and written in multiplex in consideration of a high-speed search.

In the system described above, the next REC stand-by signal may be inputted during reproduction of the digital information signal recorded by the recording-reproducing system 300. In such a case, the magnetic tape 60 is immediately fed fast forward or rewound to the next area to ready for recording. At the same time, provision is made to indicate the REC stand-by mode on the TV screen or in a part of the receiver. Then, in the case where the recording-reproducing system 300 enters the REC mode, the screen is switched to normal TV broadcast to indicate REC or turned off. This control operation can be easily performed normally by the micro-computer mounted on the VTR.

A normal video signal processing circuit can of course be connected to the recording-reproducing system 300 to permit the recording of the TV broadcast as in the prior art.

It will thus be understood from the foregoing description that according to the present invention, there is realized a digital information recording-reproducing apparatus for transmitting the software information like audio or video through radio wave or cable and recording/reproducing them, comprising the function of reducing the recording time to 1/n and expanding it to the original length on time base at the time of reproduction. At the same time, the reliability of the reproduced data is improved and the decoder circuit and the tracking control circuit are simplified. Further, the software information recorded is protected.

As described above, according to the invention, there is provided a system for selling or renting the software like audio or video through radio wave or cable, wherein the information on customers, rental period, etc. can be easily managed.

Also, as explained above, by using the magnetic recording-reproducing apparatus according to the invention, the digital information signal transmitted through a satellite or cable can be recorded accurately.

Further, according to another embodiment, the magnetic tape is divided into areas for recording, thus permitting high-speed search and lengthening the service life of the magnetic tape.

What is claimed is:

1. A digital information recording-reproducing apparatus which records and reproduces a digital information signal, comprising:

a recorder which records the digital information signal together with control information; and a reproducer which detects the recorded control information at a time the recorded digital information signal is to be reproduced, and reproduces the recorded digital information signal only if the detected control information satisfies a predetermined condition;

wherein the control information includes type information specifying a type of the digital information signal and a predetermined condition under which the digital information signal is allowed to be reproduced;

wherein the reproducer reproduces the recorded digital information signal only if the predetermined condition specified by the type information is satisfied at a time the recorded digital information signal is to be reproduced;

wherein the predetermined condition specified by the type information includes a time period during which the recorded digital information signal is allowed to be reproduced; and wherein the reproducer reproduces the recorded digital information signal only if a time at which the recorded digital information is to be reproduced is within the time period during which the recorded digital information signal is allowed to be reproduced.

2. A digital information recording-reproducing apparatus according to claim 1, wherein the recorded digital information signal is an encrypted digital information signal;

wherein the control information further includes decryption information for decrypting the encrypted digital information signal; and wherein the reproducer decrypts the encrypted digital information signal based on the decryption information when the reproducer reproduces the recorded digital information signal.

3. A digital information reproducing apparatus which reproduces a recorded digital information signal having control information recorded therewith, comprising;

a detector which detects the recorded control information; and a reproducer which reproduces the recorded digital information signal only if the detected control information satisfies a predetermined condition;

wherein the control information includes type information specifying a type of the digital information signal and a predetermined condition under which the digital information signal is allowed to be reproduced;

wherein the reproducer reproduces the recorded digital information signal only if the predetermined condition specified by the type information is satisfied at a time the recorded digital information signal is to be reproduced;

wherein the predetermined condition specified by the type information includes a time period during which the recorded digital information signal is allowed to be reproduced; and wherein the reproducer reproduces the recorded digital information signal only if a time at which the recorded digital information is to be reproduced is within the time period during which the recorded digital information signal is allowed to be reproduced.

4. A digital information reproducing apparatus according to claim 3, wherein the recorded digital information signal is an encrypted digital information signal;

wherein the control information further includes decryption information for decrypting the encrypted digital information signal; and wherein the reproducer decrypts the encrypted digital information signal based on the decryption information.

* * * * *